United States Patent [19]
Petersen et al.

[11] Patent Number: 6,154,448
[45] Date of Patent: Nov. 28, 2000

[54] NEXT HOP LOOPBACK

[75] Inventors: Lars-Göran Petersen, Tumba, Sweden; Juan Noguera-Rodriguez, Tokyo, Japan

[73] Assignee: Telefonaktiebolaget LM Ericsson (publ), Stockholm, Sweden

[21] Appl. No.: 08/879,704

[22] Filed: Jun. 20, 1997

[51] Int. Cl.[7] .................................................. G01R 31/08
[52] U.S. Cl. .......................... 370/248; 370/218; 370/241; 370/216
[58] Field of Search ..................................... 370/241, 242, 370/245, 249, 395, 396, 351, 397, 463, 216, 217, 218

[56] References Cited

U.S. PATENT DOCUMENTS

| | | | |
|---|---|---|---|
| 5,239,537 | 8/1993 | Sakauchi | 370/218 |
| 5,461,607 | 10/1995 | Miyagi | 370/244 |
| 5,659,540 | 8/1997 | Chen | 370/249 |
| 5,740,159 | 4/1998 | Ahmad | 370/249 |
| 5,793,976 | 8/1998 | Chen | 370/351 |
| 5,799,003 | 8/1998 | Fujimaki | 370/244 |
| 5,864,555 | 1/1999 | Mathur | 370/395 |
| 5,909,428 | 6/1999 | Saito | 370/244 |

OTHER PUBLICATIONS

Kanayama et al., "Virtual Path Management Functions For Broad–Band ATM Networks", Countdown to the New Millennium, Phoenix, Dec. 2–5, 1991, vol. 2, pp. 1401–1405.

Farkouh, "Managing ATM–Based Broadband Networks", IEEE Communications magazine, vol. 31, No. 5, May 1, 1993, pp. 82–86.

Draft New ITU–T Recommendation I.363.2 "B–ISDN ATM Adaptation Layer Type 2 Specification", Seoul, Feb. 1997, pp. 1–29.

"Integrated Services Digital Network (ISDN) Maintenance Principles, B–ISDN Operation and Maintenance Principles and Functions" ITU–T I.610, 1996, pp. 1–29.

*Primary Examiner*—Douglas W. Olms
*Assistant Examiner*—Ricardo M. Pizarro
*Attorney, Agent, or Firm*—Burns, Doane, Swecker & Mathis, L.L.P.

[57] ABSTRACT

In a telecommunications network, broken connections can be detected and located through a next hop loopback technique. The next hop loopback technique involves the generation, transmission, and analysis of specialized data packets which attempt to traverse a telecommunications connection, node by node. The failure of a data packet to properly traverse a link can then be used to determine whether a connection is broken, to notify the network management system as to the location of the broken connection, and whether appropriate action is warranted so that the network operator can re-route data around that portion of the network. In addition, the next hop loopback technique can be triggered on an "as needed" basis by the end user, rather than on a periodic basis, thereby conserving network time and resources.

52 Claims, 8 Drawing Sheets

NEXT HOP LOOPBACK

BACKGROUND

The present invention relates to the transmission of data in a telecommunications network. The present invention more particularly relates to identifying and locating points of failure in a telecommunications network.

Asynchronous transfer mode (ATM) is a standard protocol for transmitting telecommunications data across a telecommunications network. It is based on the transmission of data in fixed size data packets known as ATM cells, wherein each ATM cell has a 48 octet payload portion and a five octet header portion. ATM is well known in the art.

ATM is frequently used for transporting low bit rate data in telecommunications networks, for example, low bit rate voice data. However, standard ATM does not efficiently transport low bit rate data. More specifically, standard ATM tends to add a significant time delay to the transmission of low bit rate data. Unfortunately, low bit rate data, such as low bit rate voice data, is highly sensitive to these data transmission timing delays. Consequently, several different ATM adaptation layers (AALs) have been developed so that ATM can be utilized to transport low bit rate data in a more efficient manner, as is well known in the art.

One of the AALs developed to make ATM more efficient, with respect to low bit rate data, is AAL2. AAL2 is also well known in the art, and it is more thoroughly described in the B-ISDN ATM Adaptation layer Type 2 Specification, ITU Recommendation I.363.2 (herein referred to as "the AAL2 specification"). AAL2 makes ATM a more efficient vehicle for transporting low bit rate data by inserting low bit rate data from any number of different sources into AAL2 data packets, and then multiplexing the AAL2 data packets onto a single ATM connection.

In accordance with the AAL2 specification, the standard format of an AAL2 data packet is similar to that of a standard ATM cell. For example, an AAL2 data packet also has a header portion and a payload portion. However, the header portion of an AAL2 data packet is 3 octets in length and the payload of an AAL2 data packet can vary from 1 octet to 64 octets.

The header portion of an AAL2 data packet more specifically comprises an 8 bit connection identifier (CID) field, a 6 bit length indicator (LI) field, a 5 bit user-to-user information (UUI) field, and a 5 bit header error control (HEC) code. The CID field defines the AAL2 channel to which the AAL2 packet belongs. According to the AAL2 specification, the AAL2 packet may be associated with one of 248 different AAL2 channels. Accordingly, AAL2 data packets from as many as 248 different AAL2 sources can be multiplexed onto a single ATM connection. The LI field, as the name suggests, defines the length of the payload portion of the AAL2 data packet (e.g., the number of octets in the payload portion). The HEC code is specifically used for detecting errors in the header portion of the AAL2 packet.

The purpose of the UUI field is to convey information about the corresponding AAL2 packet between a source node (i.e., the network node that generates the AAL2 packet), a destination node (i.e., the network node to which the AAL2 data packet is being sent), and possibly, a number of intermediate nodes. As stated, there are 5 bits in the UUI field. Therefore, 32 different binary combinations (i.e., codepoints) are possible. In accordance with the AAL2 specification, two of these codepoints are specifically reserved for identifying the corresponding AAL2 packet as an operation and maintenance (OAM) data packet.

A standard ATM cell header includes a 3 bit field called the payload type indicator (PTI) field. The function of the PTI field in an ATM cell header is similar to the function of the UUI field in the AAL2 packet header. For example, two of the eight possible PTI field codepoints are used to identify the corresponding ATM cell as an OAM cell, particularly, an OAM cell that is employed to perform loopback testing. Loopback testing is an OAM function used to detect broken connections in the network. One of these two codepoints specifically identifies the ATM cell as an end-to-end loopback packet. The other codepoint identifies the ATM cell as a segment loopback packet. An end-to-end loopback packet is used for determining whether a broken connection exists somewhere between a source node and a destination node, wherein one or more intermediate nodes exist between the source and destination nodes. However, the precise location of the break cannot be determined. A segment loopback packet is always forwarded from a source node to an adjacent destination node and then back to the source node, and it is only used for determining whether a broken connection exists between that source node and that adjacent destination node.

In practice, the ATM loopback procedure is very complex. For example, the end-to-end loopback packet procedure does not precisely locate a broken connection between a source node and a non-adjacent destination node. In addition, the segment loopback procedure does not detect nor can it precisely locate a broken connection between a source node and a destination node unless the break specifically occurs between the source node and the adjacent destination node specified by the segment loopback packet. In order to precisely locate a broken connection using ATM, the network operator must periodically test every network link and/or connection individually. Typically, this is accomplished as a background task. Consequently, a significant amount of network time and network resources (e.g., bandwidth) are unnecessarily expended. Therefore, a more simplified and efficient procedure is needed to detect the location of broken connections within a network, and to do so on an "as needed" basis rather than on a periodic basis.

SUMMARY

It is an objective of the present invention to provide a simplified procedure for detecting broken connections in a telecommunications network.

It is another objective of the present invention to provide a simplified procedure for detecting broken connections in a telecommunications network that is initiated by an end user on an "as needed" basis, rather than by the network operator on a periodic basis.

It is also an objective of the present invention to provide a more efficient procedure for locating broken connections within the network so that the network can properly re-route data packets around the broken connections.

It is still another objective of the present invention to provide a simplified and more efficient procedure for detecting and locating broken connections so that critical network resources are conserved.

In accordance with one aspect of the present invention, the foregoing and other objects are achieved by a method and/or an apparatus for detecting a failure in a telecommunications network which involves forwarding a first communication packet from a first node to a second node adjacent to the first node in a first direction along a communication path; forwarding the first communication packet from the second node to a third node adjacent to the second node in the first direction along the communication path; and transmitting a second communication packet from the second node to the first node. The method and/or the apparatus also involves generating a fault signal indicating a failure between the first node and the second node if the second communication packet is not received by the first node within a predetermined period of time.

In accordance with another aspect of the present invention, the foregoing and other objects are achieved by a method and/or an apparatus for detecting a failure in a telecommunications network which involves forwarding a first communication packet in the direction of a destination node from a first node to a second node adjacent to the first node, wherein the second node is located along a communication path between the first node and the destination node; setting a timing counter in the first node when the first node forwards the first communication packet to the second node; forwarding the first communication packet along the communication path in the direction of the destination node from the second node to a next node adjacent to the second node; and transmitting a second communication packet from the second node to the first node. The method and/or the apparatus also involves generating a fault message if the second communication packet is not received by the first node within a predetermined period of time as measured by the timing counter.

In accordance with yet another aspect of the present invention, the foregoing and other objects are achieved by a method and/or an apparatus for detecting and locating broken connections in a telecommunication network comprising a source node, a destination node and at least one intermediate node located along a communication path between the source node and the destination node, wherein the method and/or the apparatus involves generating a forward loopback packet in the source node; forwarding the forward loopback packet, node by node, from the source node to the destination node along the communication path; and transmitting a backward loopback packet, at each of the at least one intermediate nodes and at the destination node, towards the source node to an adjacent node located along the communication path, if the at least one intermediate node and the destination node received a forward loopback packet. The method and/or apparatus also involves generating a fault message at the source node and each of the at least one intermediate nodes, if a backward loopback packet is not received within a predetermined period of time.

BRIEF DESCRIPTION OF THE DRAWINGS

The objects and advantages of the invention will be understood by reading the following detailed description in conjunction with the drawings in which.

DETAILED DESCRIPTION

The present invention identifies and locates broken connections at or between switching nodes in a telecommunications network. Although the following discussion describing the present invention focuses on an implementation using the asynchronous transfer mode adaptation layer number two (AAL2), one skilled in the art will recognize that the present invention could be applied using the asynchronous transfer mode (ATM) layer, or other ATM adaptation layers (AALS) which are well known in the art.

Figure 1:
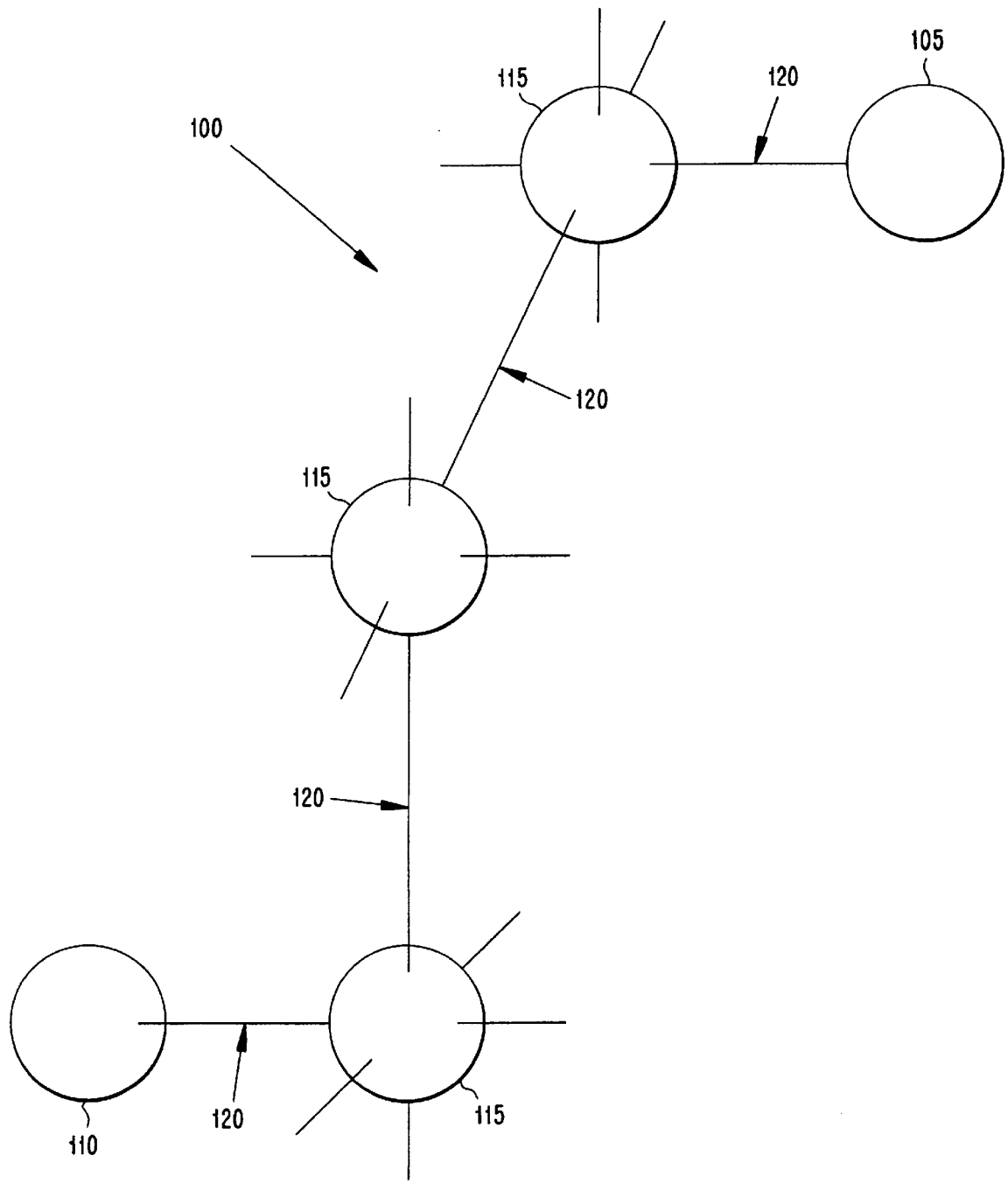
FIG. 1 illustrates an AAL2 connection in accordance with the prior art.

FIG. 1 represents an AAL2 connection 100 between a source node 105 and a destination node 110. The AAL2 connection 100 includes three intermediate nodes 115 between the source node 105 and the destination node 110. The purpose of the intermediate nodes 115 is to perform the switching functions that are necessary to route an AAL2 data packet (not shown) along the AAL2 connection 100 from the source node 105 to the destination node 110. In addition, the AAL2 connection 100 includes a number of concatenated AAL2 channels 120, wherein each AAL2 channel 120 forms but a portion of the AAL2 link between adjacent nodes. Although it is difficult to visualize in FIG. 1, each AAL2 channel 120 is multiplexed with other AAL2 channels (not shown) to complete the link between each pair of adjacent nodes. At each node, an AAL2 channel 120 is multiplexed with different AAL2 channels. As stated above, routing data through a telecommunications network using AAL2 is well known in the art.

Figure 2:
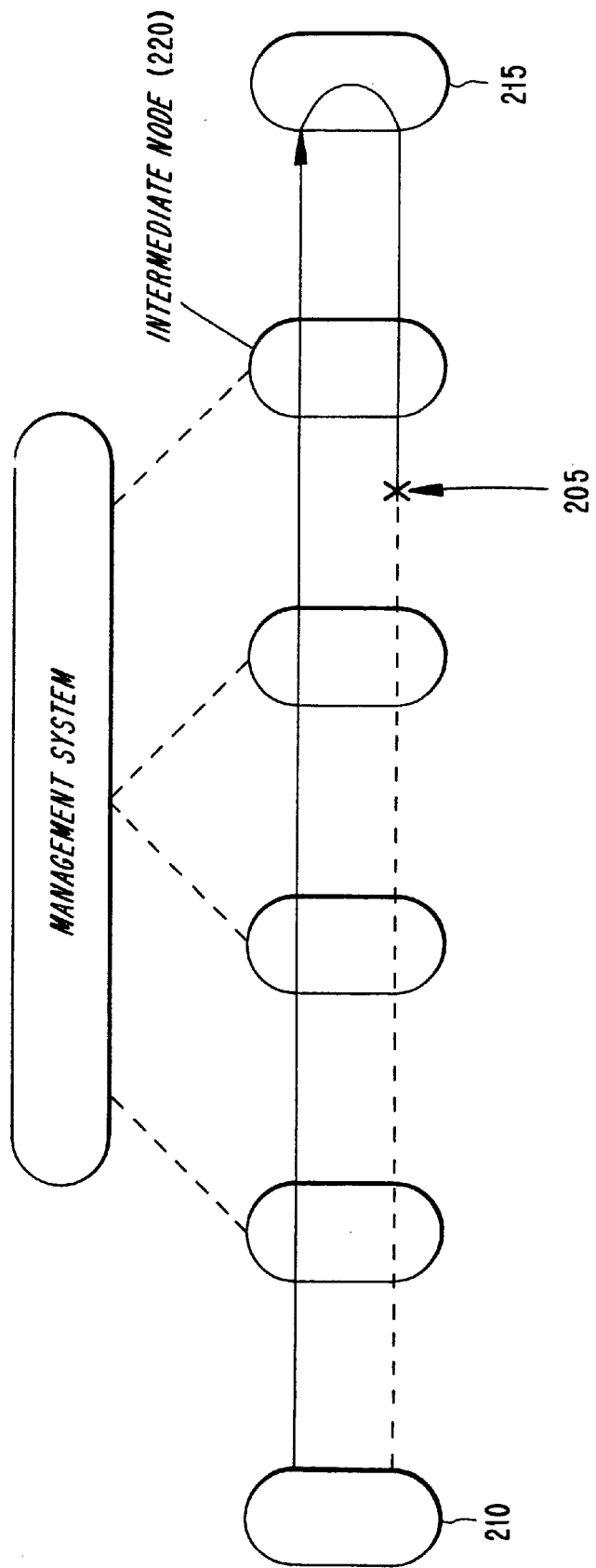
FIG. 2 shows an end-to-end loopback test in accordance with the prior art.

Occasionally, a connection between two adjacent nodes will fail. FIG. 2 illustrates an exemplary procedure for detecting a broken connection 205 using an end-to-end loopback technique. In accordance with this technique, the source node 210 and the destination node 215 are defined as endpoints by the network operator. Source node 210 then periodically generates an ATM cell whose payload type indicator (PTI) field identifies the ATM cell is an end-to-end loopback packet. The packet is then passed from the source node 210, through each of the intermediate nodes, for example intermediate node 220, until the packet reaches the destination node 215. No processing occurs at the intermediate nodes. The destination node 215 then re-transmits the packet to the source node 210, wherein the packet encounters the broken connection 205. After a predetermined period of time elapses, during which the packet fails to return to the source node 210, the source node 210 provides an indication that a broken connection exists somewhere between the source node 210 and the destination node 215. The technique illustrated in FIG. 2 is currently implemented using ATM, and it is well-known in the art.

Figure 3:
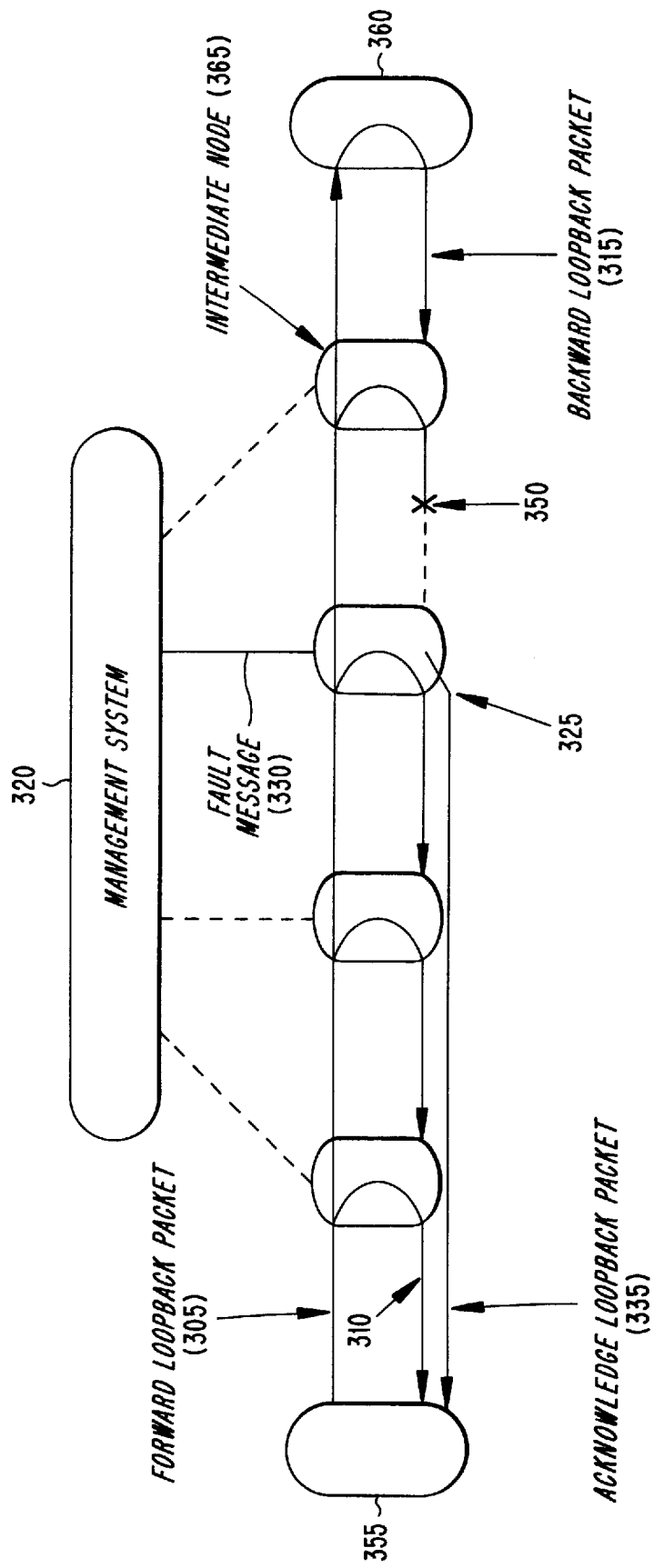
FIG. 3 shows the Next Hop Loopback test in accordance with the present invention.

In accordance with a preferred embodiment of the present invention, a next hop loopback test is performed using an AAL2 connection, as illustrated in FIG. 3, in response to the detection of a broken connection 350 by source node 355 during an end-to-end loopback test as illustrated in FIG. 2. The next hop loopback test is capable of precisely locating the broken connection in a deliberate, systematic fashion, such that the network operator can efficiently respond to the break by re-routing network data around the broken connection accordingly.

As illustrated in FIG. 3, the source node 355 generates a segment forward loopback packet 305. The segment forward loopback packet 305 is then forwarded to the destination node 360 by way of each intermediate node, for example, intermediate node 365. Upon receiving the segment forward loopback packet 305, each intermediate node generates a backward loopback packet, for example backward loopback packet 310, by making a copy of the segment forward loopback packet 305 but for the loopback indicator in the payload portion which identifies the packet as a backward loopback packet. Each intermediate node forwards the backward loopback packet to the previous node, while forwarding the original segment forward loopback packet 305 to the next node. Eventually, the segment forward loopback packet 305 reaches the destination node 360. The destination node 360 similarly generates a backward loopback packet 315 which is forwarded to the previous intermediate node 365.

The backward loopback packets are then used to precisely locate the broken connection 350. As soon as the source node 355 and each intermediate node forwards the segment forward loopback packet 305, each node begins measuring time. If after a predetermined period of time the source node 355 and/or any of the intermediate nodes fail to receive a backward loopback packet from the next node, one or more fault messages, for example fault message 330, are sent to the network management system 320 by those nodes failing to receive a backward loopback packet. In FIG. 3, the broken connection is located between intermediate node 365 and intermediate node 325. In accordance with the next hop loopback technique described above, only the intermediate node 325 fails to receive a backward loopback packet. Therefore, the intermediate node 325 transmits the fault message 330 to the network management system 320, thereby informing the network that a broken connection 350 has been detected and located between the intermediate nodes 365 and 325.

In addition to transmitting a fault message 330, the intermediate node 325, after failing to receive a backward loopback packet from the intermediate node 365, also transmits an acknowledge loopback packet 335 to the source node 355, in accordance with a preferred embodiment of the present invention. The acknowledge loopback packet 335 contains a UUI field in the AAL2 packet header identifying the packet as an end-to-end packet, rather than a segment packet. The purpose of the acknowledge loopback packet 335 is to confirm for the source node 355 that a broken connection 350 was detected and that a fault message 330 was sent to the network management system 320.

In accordance with another aspect of the present invention, the next hop loopback test is repeated in the opposite direction. In other words, the node 360 becomes the source node and node 355 becomes the destination node. The node 360 then generates a segment forward loopback packet towards the node 355. Since the broken connection 350 is located between the intermediate node 365 and the intermediate node 325, the node 360 receives a backward loopback packet from the intermediate node 365, but intermediate node 365 does not receive a backward loopback packet from the intermediate node 325. Accordingly, the intermediate node 365 generates a fault message for the network management system 320 confirming the broken connection 350 between the intermediate nodes 365 and 325.

Figure 4:
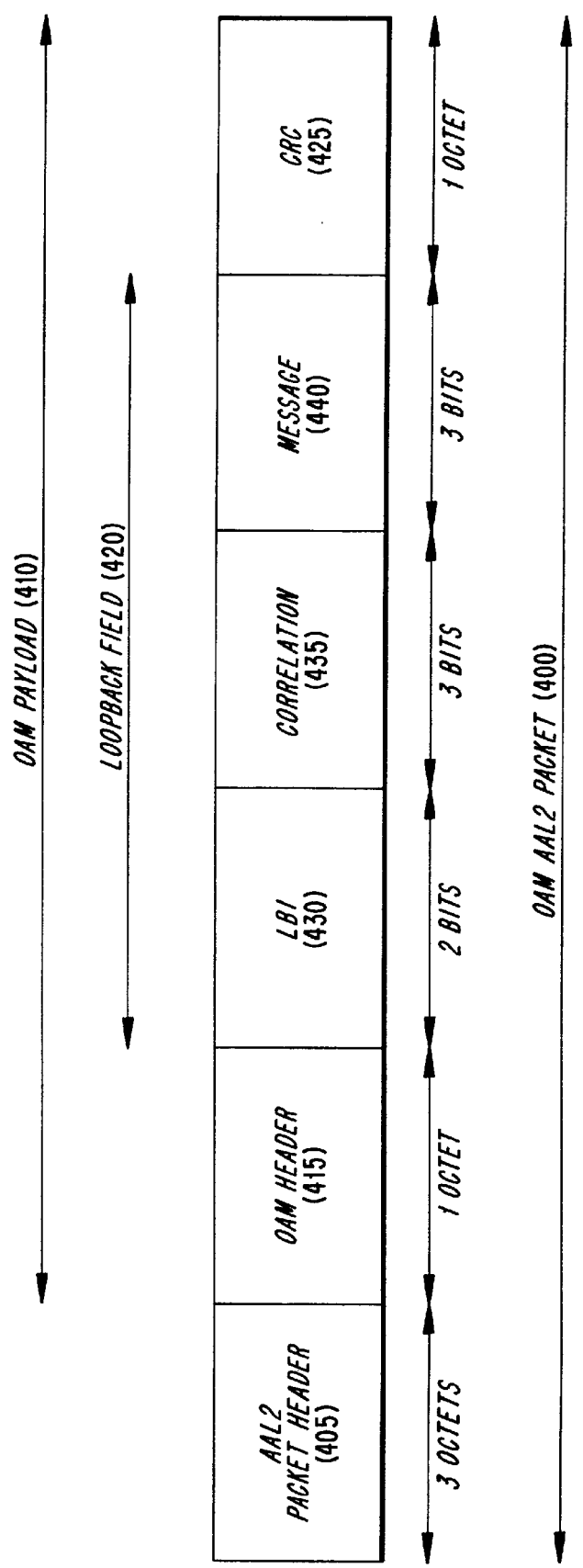
FIG. 4 shows an exemplary protocol for an OAM AAL2 loopback packet.

FIG. 4 shows an exemplary format for an OAM AAL2 packet 400 in accordance with a preferred embodiment of the present invention. The OAM AAL2 packet 400 includes an AAL2 packet header portion 405, as described above, and as defined in the AAL2 specification, and an OAM payload 410. The AAL2 packet header 405 includes a 5 bit UUI field, also as described above, and that two of the UUI binary code combinations specifically identify the OAM AAL2 packet 400 as an OAM AAL2 packet. Moreover, the first of these two UUI binary code combinations, for example, the binary code combination 11110 (i.e., 30 in decimal), indicates a segment OAM AAL2 packet. The backward loopback packets and the segment forward loopback packets are segment OAM AAL2 packets. The second of the two UUI binary code combinations, for example, the binary code combination 11111 (i.e., 31 in decimal), indicates an end-to-end OAM AAL2 packet. Acknowledge loopback packets are end-to-end OAM AAL2 packets.

FIG. 4 also illustrates that, in accordance with a preferred embodiment of the present invention, the OAM payload portion 410 includes a 1 octet OAM header 415, a 1 octet loopback field 420, and a 1 octet cyclic redundancy code (CRC) 425. In addition, the loopback field 420 includes a 2 bit loopback indicator (LBI) field 430, a loopback correlation field 435, and a loopback message field 440. One skilled in the art will recognize that the position and length of each field in the OAM payload 410 may vary without departing from the intended scope of this invention.

The specific format of the OAM header 415 is similar to the OAM header format used in conjunction with the ATM as defined in ITU Recommendation I.363.2, B-ISDN Operation and Maintenance Principles and Functions, section 4.2, 6 and 7. More specifically, the OAM header 415 reflects one of a number of possible binary code combinations which define the type of OAM function corresponding to the OAM AAL2 packet 400. At least one of these binary code combinations is assigned for loopback purposes.

The LBI 430 is a 2 bit field. It defines the loopback packet type. For example, a LBI binary code combination of 00 might indicate that the OAM AAL2 packet is a forward loopback packet, a binary code of 01 might indicate that the OAM AAL2 packet is a backward loopback packet, a code of 10 might indicate that the packet is an acknowledge loopback packet, and a code of 11 might indicate that the OAM AAL2 packet is an intermediate loopback packet. The LBI field also identifies whether the OAM AAL2 packet has, in fact, been looped back. For example, backward and acknowledge loopback packets are packets that loopback, while forward loopback packets do not loop back. Packets which loop back are discarded once they arrive at their intended destination, whereas packets that do not loop back may be forwarded to a next node.

The loopback correlation field 435 is a 3 bit code used to correlate loopback packets that correspond with one another in the event that a given node is involved with more than one set of pending loopback packets at a given time. In a preferred embodiment of the present invention, the loopback correlation field 435 is a 3 bit wrap around counter. The value of the counter is controlled exclusively by the source node. Although the source node typically does not generate more than one forward loopback packet at a time, a node may be part of two or more AAL2 connections simultaneously. Therefore, a node must have the capability of distinguishing between different sets of loopback packets.

The loopback message field 440 is also a 3 bit code. As the name suggests, the loopback message field 440 is used to convey different loopback messages or modes. Although the loopback message field can generate up to eight different message codes, the actual message or mode reflected by a given code depends upon the loopback packet type defined by the LBI field 430. TABLE I contains a list of several exemplary loopback messages. One skilled in the art will recognize, however, that this list of possible loopback messages is not limited to those shown in TABLE I.

The CRC field 425 is used for protecting the other fields in the OAM payload 410. As stated above, the use of CRCs is well-known in the art.

TABLE I

| Loopback Packet Type | Message Code | Message |
|---|---|---|
| Forward Loopback Packet | 001 | Basic Mode. Packet propagated and copied as a backward loopback packet. Acknowledge loopback packet generated by the node at the point of failure. |
| | 002 | Basic Mode. See message code 001. No acknowledge loopback packet generated. |
| | 003 | Basic Mode. See message code 001. Acknowledge loopback packet generated by every node. |
| | 004 | Do not propagate a next hop packet. Do not generate an acknowledge loopback packet. Used exclusively to check connection with neighboring node. |
| Acknowledge Loopback Packet | 001 | Fault Detected. Cannot at this time notify network management system. Fault possibly mixed. |
| | 002 | Fault Detected. Network management system notified. Continue generating loopback packets until fault is fixed. |
| | 003 | Fault Detected and Fixed. Release connection and setup. |
| | 004 | No Fault Detected. |
| | 005 | Destination Acknowledge. Generated by the destination node in response to forward loopback packet message codes 001 and 003. Used to indicate that forward loopback packet received by all intermediate nodes. |
| Backward Loopback Packet | 001 | Terminate the packet. |
| Intermediate Loopback Packet | 001 | Terminate the packet. |

Figure 5:
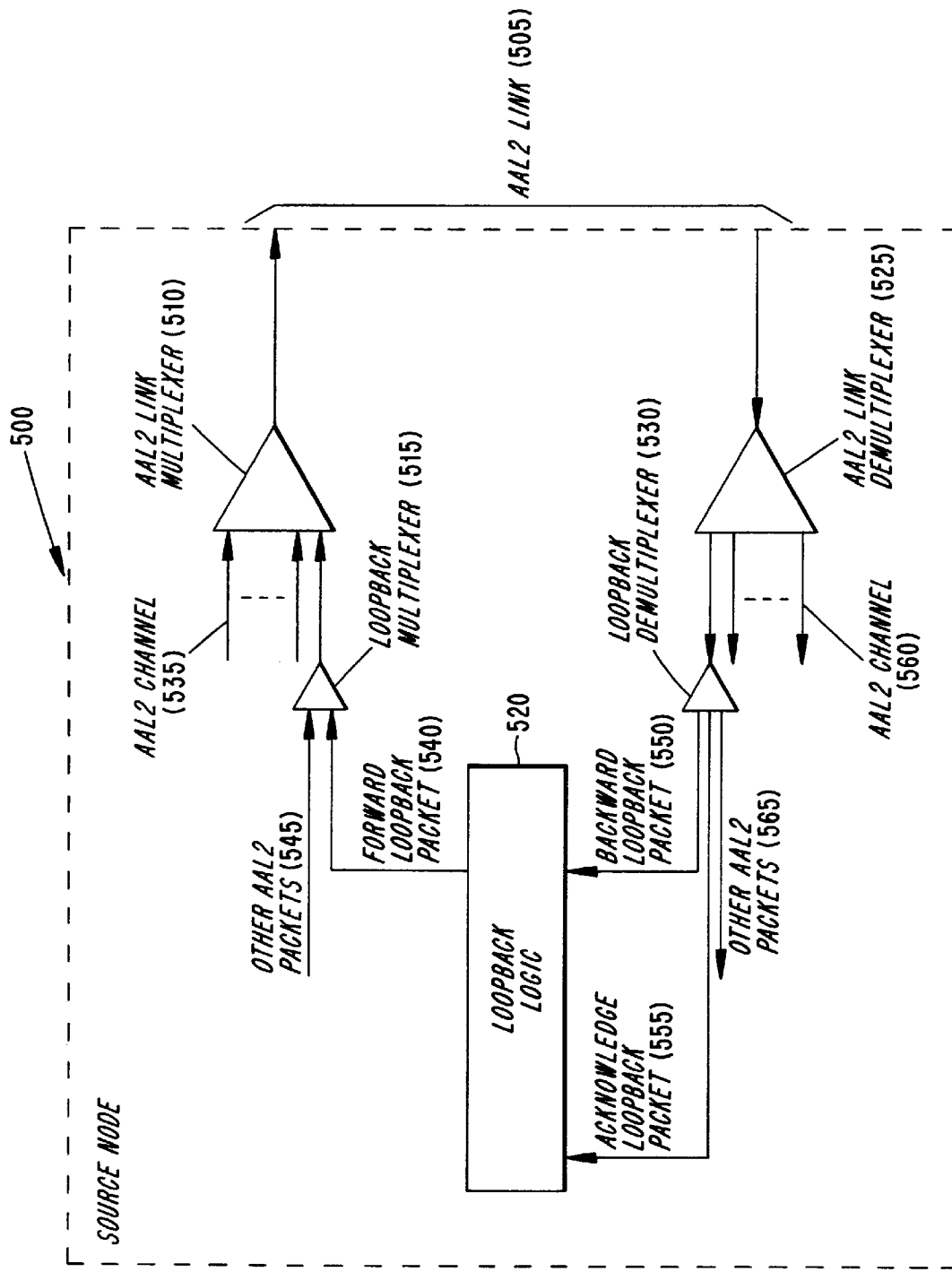
FIG. 5 is an exemplary hardware embodiment for a source node.

FIG. 5 shows an exemplary hardware embodiment for a source node 500, wherein source node 500 is connected to an adjacent node (not shown) by an AAL2 link 505. The source node 500 includes an AAL2 link multiplexer 510, a loopback multiplexer 515, loopback logic 520, an AAL2 link demultiplexer 525, and a loopback demultiplexer 530.

As stated above, each AAL2 channel, for example AAL2 channel 535, makes up but a portion of the AAL2 link. The AAL2 link actually consists of a number of AAL2 channels multiplexed together. In a preferred embodiment of the present invention, the various AAL2 channels are multiplexed by the AAL2 link multiplexer 510. By multiplexing the various AAL2 channels, AAL2 data packets, both OAM and non-OAM packets are forwarded to the adjacent node via the AAL2 link 505, wherein the adjacent node may be the destination node for some of the AAL2 channels and an intermediate node for the other AAL2 channels.

The loopback multiplexer 515 multiplexes forward loopback packets, for example forward loopback packet 540, with other AAL2 packets 545 associated with the same AAL2 channel. The other AAL2 packets may or may not be OAM AAL2 packets.

The loopback logic 520 is responsible for receiving and generating loopback packets for the source node 500. As one skilled in the art will understand, the loopback logic 520 may be implemented in hardware or it may be implemented in software in accordance with standard programming techniques. Once an AAL2 connection is established, the loopback logic 520 checks the quality of the connection by periodically generating an end-to-end forward loopback packet, in accordance with the end-to-end loopback technique illustrated in FIG. 1. If no end-to-end backward loopback packet is received by the loopback logic 520 within the predetermined period of time, the loopback logic 520 generates a segment forward loopback packet in accordance with the next hop loopback technique illustrated in FIG. 3. Under ordinary circumstances, the loopback message field 440 in the segment forward loopback packet will indicate a next hop loopback basic mode 001 (see TABLE I). Accordingly, the loopback logic 520 can expect to receive one or more acknowledge loopback packets, for example, acknowledge loopback packet 555, indicating the presence and location of a connection failure, if one exists, and possibly, the action taken to avoid and/or clear the failure.

The AAL2 demultiplexer 525 separates the different AAL2 channels received by the source node 500, for example AAL2 channel 560. For the AAL2 connection, which the source node 500 is an endpoint, the loopback demultiplexer 530 separates the loopback OAM AAL2 packets from the other AAL2 packets 565 (i.e., from the non-loopback OAM AAL2 packets). The OAM payload is then opened and the CRC 425 is used to check for errors. Next, the LBI field 430 is checked to determine if the packet is an acknowledge loopback packet, for example acknowledge loopback packet 555, or a backward loopback packet, for example backward loopback packet 550. If the packet is either an acknowledge loopback packet or a backward loopback packet, it is passed to the loopback logic 520 as illustrated in FIG. 5.

Figure 6:
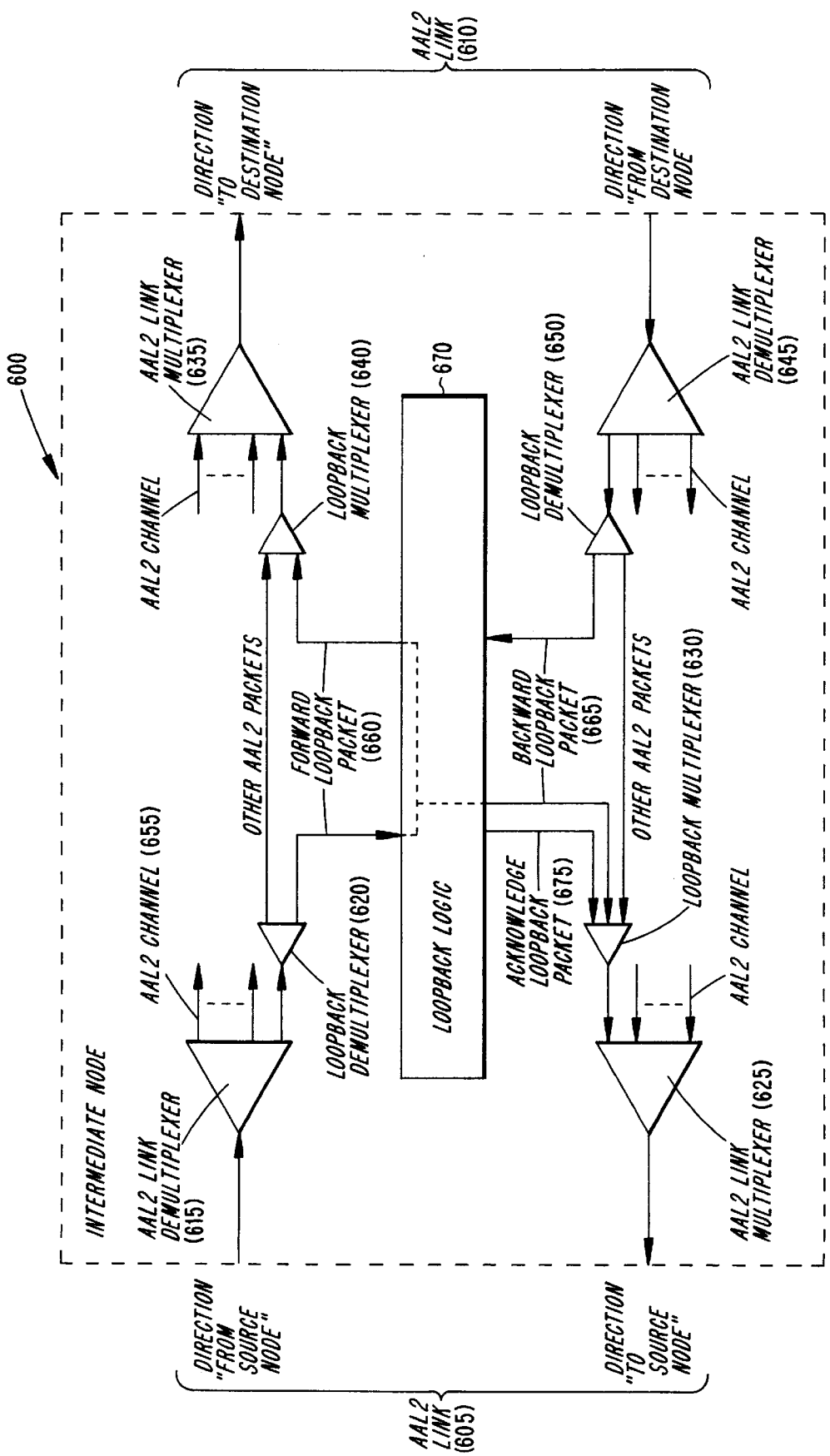
FIG. 6 is an exemplary hardware embodiment for an intermediate node.

FIG. 6 illustrates an exemplary hardware embodiment for an intermediate node 600, wherein the intermediate node 600 is connected to a source node or an adjacent intermediate node in the direction of the source node by an AAL2 link 605. The intermediate node 600 is also connected to a destination node or an adjacent intermediate node in the direction of the destination node by an AAL2 link 610.

As shown in FIG. 6, the intermediate node 600 includes a first AAL2 link demultiplexer 615 and a first loopback demultiplexer 620. The intermediate node 600 also includes a second AAL2 link demultiplexer 645 and a second loopback demultiplexer 650. The first and second link demultiplexers 615 and 645 are used for separating AAL2 channels, while the first and second loopback demultiplexers 620 and 650 are used for separating AAL2 packets. The intermediate node 600 also includes a first AAL2 link multiplexer 625 and a first loopback multiplexer 630. In addition, the intermediate node 600 includes a second AAL2 link multiplexer 635 and a second loopback multiplexer 640. The first and second loopback multiplexers 630 and 640 are used for multiplexing AAL2 packets into a single AAL2 channel, then the first and second link multiplexers 625 and 635 are used for multiplexing the AAL2 channels onto the AAL2 link 605 or onto the AAL2 link 610.

It is the responsibility of the intermediate node 600 to relay AAL2 packets, associated with the different AAL2 channels, to a next node. The AAL2 link multiplexers 625 and 635 as well as the AAL2 link demultiplexers 615 and 645 operate the same way as the AAL2 link multiplexer 510 and the AAL2 link demultiplexer 525 in the source node 500 described above. These link multiplexers and link demultiplexers handle the relaying of AAL2 packets from the intermediate node 600 to the next node. As one skilled in the art will recognize, an AAL2 channel, for example AAL2 channel 655, entering the intermediate node 600 from the AAL2 link 605 may be passed to the AAL2 link multiplexer 635 and transmitted over the AAL2 link 610, or the AAL2 channel 655 may be routed in another direction, through an AAL2 link multiplexer (not shown) other than the link multiplexer 635, and over an AAL2 link (not shown) other than the AAL2 link 610.

FIG. 6 shows the intermediate node 600 receiving forward loopback packets such as forward loopback packet 660 from the direction of the source node (i.e., from the AAL2 link 605), and receiving backward loopback packets such as backward loopback packet 665 from the direction of the destination node (i.e., from the AAL2 link 610). Moreover, FIG. 6 shows an acknowledge loopback packet 475 being generated and then routed in the direction of the source node. However, as stated above, the next hop loopback test can be, and typically is, executed twice, once in each direction along the corresponding AAL2 connection between the two endpoint nodes. Therefore, the intermediate node 600 is actually capable of receiving forward loopback packets from the AAL2 link 610 as well as the AAL2 link 605. The intermediate node 600 is also capable of receiving backward loopback packets from the AAL2 link 605 as well as the AAL2 link 610. And, finally, the intermediate node 600 is capable of generating and routing acknowledge loopback packets over both the AAL2 link 605 and the AAL2 link 610.

As described above, the intermediate node 600 also contains a first and a second loopback multiplexer 630 and 640 as well as a first and a second loopback demultiplexer 620 and 650. The function of the loopback multiplexers and demultiplexers is the same as the loopback multiplexer and demultiplexer 515 and 530 respectively, as illustrated in the source node 500 of FIG. 5.

The intermediate node further includes loopback logic 670. The loopback logic 670 is responsible for analyzing the forward and backward loopback packets received from adjacent nodes, and in accordance with the corresponding message fields, taking the appropriate action (see TABLE I). For example, if the message field in the forward loopback packet 660 indicates a next hop loopback basic mode, the loopback logic 670 causes the forward loopback packet 660 to be forwarded to the next node in the direction of the destination node. The loopback logic 670 also causes a backward loopback packet (not shown), having the same correlation field code as the forward loopback packet 660, to be forwarded to the previous node in the direction of the source node. In addition, the loopback logic 670 sets a timing counter (not shown) which is used to measure the amount of time it takes to receive the backward loopback packet 665, if at all, from the next node in the direction of the destination node. If the backward loopback packet 665 is received by the loopback logic 670 before the timing counter indicates that a certain predetermined period of time has elapsed, the loopback logic 670 will simply discard the backward loopback packet 665. If, however, the loopback logic 670 does not receive the backward loopback packet before the predetermined period elapses, the loopback logic 670 generates an acknowledge loopback packet 675 indicating the possibility of a broken connection and the action to be taken, if any.

As stated, there are four basic loopback packet types associated with the next hop loopback test: forward loopback packets, backward loopback packets, acknowledge loopback packets and intermediate loopback packets. Intermediate loopback packets are specifically used for determining the integrity of the internal AAL2 connection of an intermediate node.

Figure 7:
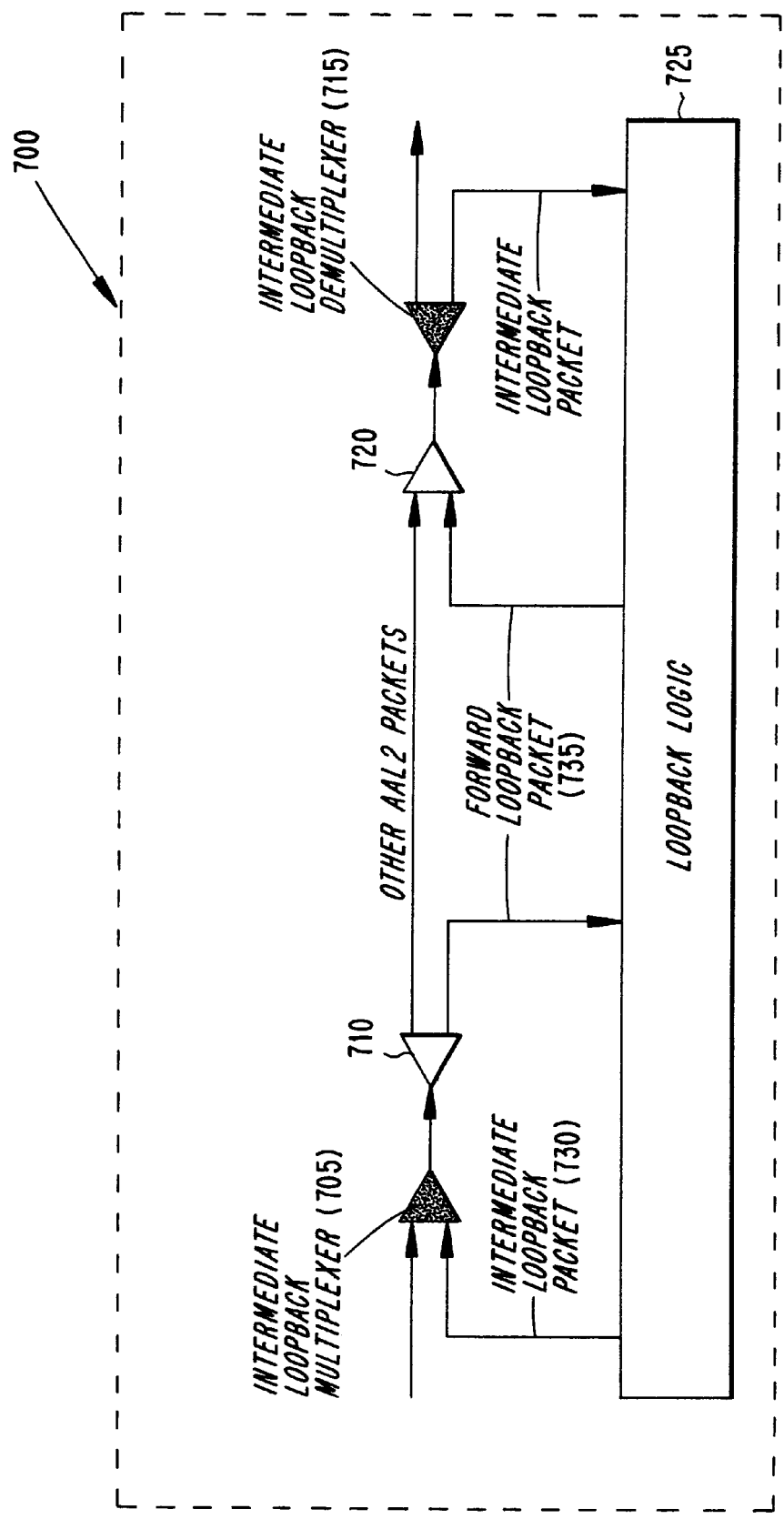
FIG. 7 is another exemplary hardware embodiment for an intermediate node.

FIG. 7 depicts a portion of an intermediate node 700, in accordance with an alternative hardware embodiment of the present invention, wherein the internal AAL2 connection of the intermediate node 700 is protected by intermediate loopback packets. The configuration of the intermediate node 700 is essentially the same as the configuration of the intermediate node 600, illustrated in FIG. 6, except that the intermediate node 700 further includes an intermediate loopback multiplexer (e.g., intermediate loopback multiplexer 705) between each AAL2 link multiplexer (not shown) and each loopback multiplexer (e.g., loopback multiplexer 710). The intermediate node 700 also includes an intermediate loopback demultiplexer (e.g., intermediate loopback demultiplexer 715) between each AAL2 link demultiplexer (not shown) and each loopback demultiplexer (e.g., loopback demultiplexer 720). FIG. 7 also shows loopback logic 725 generating and propagating an intermediate loopback packet 730 in only one direction along the AAL2 connection (e.g., in the direction of the destination node). However, it will be recognized, that the loopback logic 725 also is capable of generating and propagating an intermediate loopback packet in the opposite direction along the AAL2 connection.

In accordance with this alternative embodiment depicted in FIG. 7, the loopback logic 725 generates an internal loopback packet, such as intermediate loopback packet 730, whenever a forward loopback packet 735 is received. Alternatively, the loopback logic 725 could generate an intermediate loopback packet on a periodic basis. Upon generating the intermediate loopback packet 730, the loopback logic 725 initiates a timing counter (not shown). The loopback packet 730 is then multiplexed into the corresponding AAL2 channel by the intermediate loopback multiplexer 705, along with other AAL2 packets associated with that AAL2 channel. Assuming there are no breaks in the AAL2 connection between the intermediate loopback multiplexer 705 and the intermediate loopback demultiplexer 715, the intermediate loopback packet 730 is extracted from the AAL2 channel by the intermediate loopback demultiplexer 715 and returned to the loopback logic 725. However, if a predetermined period of time elapses, as measured by the timing counter, the loopback logic 725 generates a fault message (not shown) for the network management system and an appropriate acknowledge loopback packet (not shown) for the source node.

Figure 8:
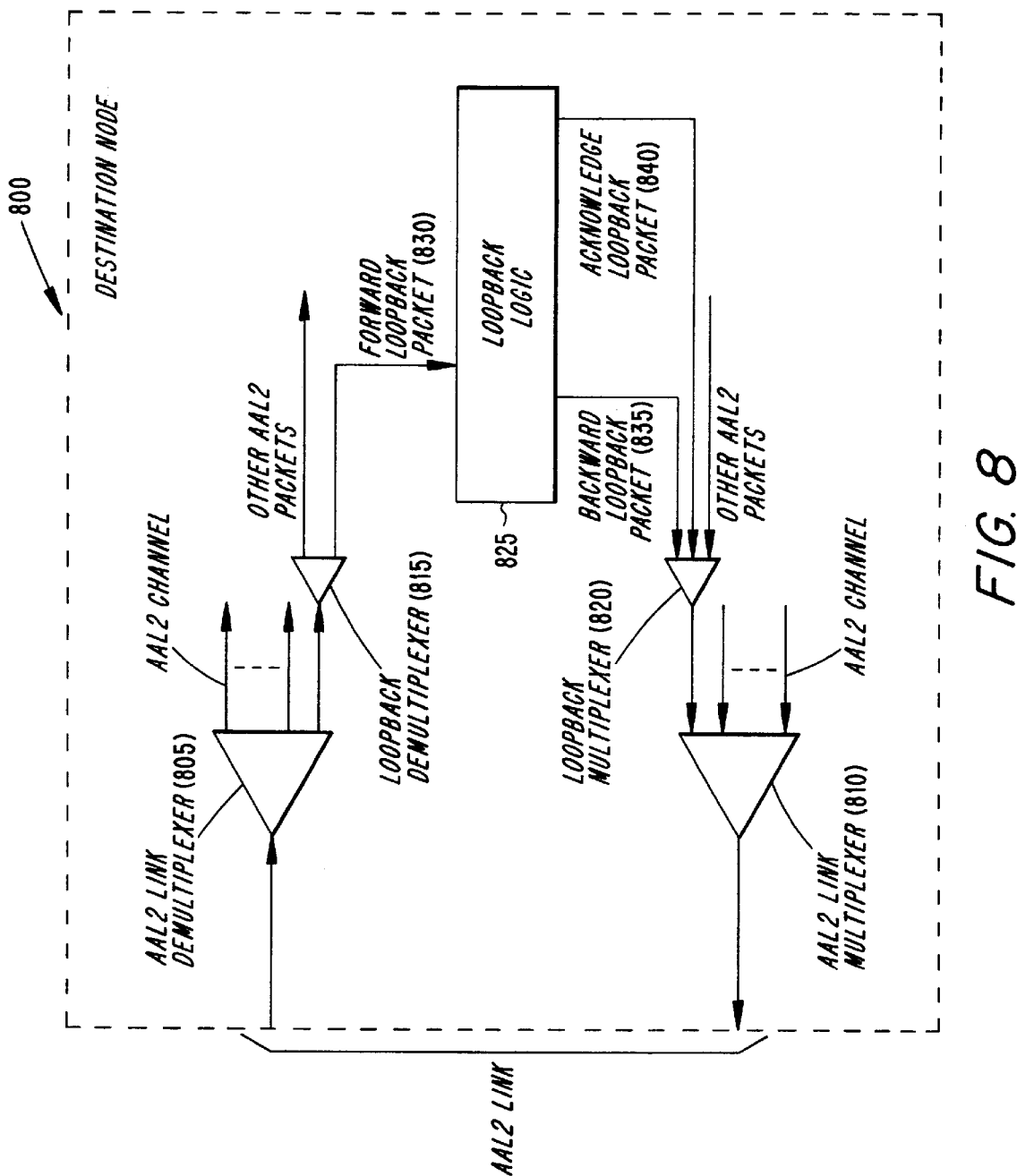
FIG. 8 is an exemplary hardware embodiment for a destination node.

FIG. 8 represents an exemplary hardware embodiment for a destination node 800, in accordance with the present invention. Destination node 800 includes an AAL2 link demultiplexer 805, an AAL2 link multiplexer 810, a loopback demultiplexer 815, and a loopback multiplexer 820. These link and loopback multiplexers and demultiplexers operate in a similar manner as those link and loopback multiplexers and demultiplexers described above with respect to the source node 500 and the intermediate nodes 600 and 700.

The destination node 800 also includes loopback logic 825. The loopback logic 825 analyzes incoming forward loopback packets (e.g., forward loopback packet 830). If the forward loopback packet 830 is an end-to-end forward loopback packet, the loopback logic 825 generates an end-to-end backward loopback packet for the source node. If the forward loopback packet 830 is a segment forward loopback packet, the loopback logic 825 generates a segment backward loopback packet 835 for the previous intermediate node (not shown). The loopback logic 825 also generates an acknowledge loopback packet 840 for the source node, indicating to the source node that the segment forward loopback packet 830 successfully traversed all of the intermediate nodes.

The techniques and hardware implementations associated with the next hop loopback test described above, provide a simple, efficient, and precise way of locating broken connections in a telecommunications network. Consequently, the present invention conserves valuable network time and network resources as compared with prior methods.

The present invention has been described with reference to several exemplary embodiments. However, it will be readily apparent to those skilled in the art that it is possible to embody the invention in specific forms other than those of the exemplary embodiments described above. This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for detecting a failure in a telecommunications network comprising the steps of:

forwarding a first communication packet from a first node to a second node adjacent to the first node in a first direction along a communication path;

forwarding the first communication packet from the second node to a third node adjacent to the second node in the first direction along the communication path;

transmitting a second communication packet from the second node to the first node in response to reception of the first communication packet from the first node; and generating a fault signal indicating a failure between the first node and the second node if the second communication packet is not received by the first node within a predetermined period of time.

2. The method of claim 1 further comprising the step of:

transmitting a third communication packet from the first node to a source node, if the second communication packet is not received by the first node, wherein the third communication packet informs the source node that a fault has been detected.

3. The method of claim 2, wherein the third communication packet is transmitted along the communication path in a second direction that is opposite the first direction.

4. The method of claim 1, wherein the predetermined period of time is measured from when the first communication packet is forwarded from the first node to the second node.

5. The method of claim 4 further comprising the step of:

setting a timing counter when the first communication packet is forwarded from the first node to the second node.

6. A method for detecting a failure in a telecommunications network comprising the steps of:

forwarding a first communication packet in the direction of a destination node from a first node to a second node adjacent to the first node, wherein the second node is located along a communication path between the first node and the destination node;

setting a timing counter in the first node when the first node forwards the first communication packet to the second node;

forwarding the first communication packet along the communication path in the direction of the destination node from the second node to a next node adjacent to the second node;

transmitting a second communication packet from the second node to the first node in response to reception of the first communication packet from the first node; and generating a fault message if the second communication packet is not received by the first node within a predetermined period of time as measured by the timing counter.

7. The method of claim 6 further comprising the step of:

transmitting a third communication packet from the first node to a source node if the second communication packet is not received by the first node within the predetermined period of time, wherein the third communication packet informs the source node that a failure has been detected between the first and second nodes.

8. The method of claim 6, wherein the first node is a source node.

9. The method of claim 6 further comprising the step of:

forwarding the fault message from the first node to a network manager.

10. The method of claim 6 further comprising the steps of:

forwarding the first communication packet along the communication path, node by node, from the next node to the destination node;

at the next node, the destination node, and each node located between the next node and the destination node, if any, transmitting another second communication packet to an adjacent node located along the communication path towards a source node in response to receiving the first communication packet; and at the second node, the next node and each node between the next node and the destination node, if any, generating a fault message if the another second communication packet is not received within a predetermined period of time.

11. The method of claim 10 further comprising the steps of:

at the second node, the next node and each node between the next node and the destination node, if any, transmitting a third communication packet to the source node if the another second communication packet is not received within the predetermined period of time, wherein the third communication packet informs the source node that a fault has been detected.

12. The method of claim 11, wherein the first node is the source node.

13. The method of claim 10 further comprising the step of:

at the second node, the next node and each node between the next node and the destination node, if any, transmitting the fault message to a network manager if the fault message is generated.

14. A method for detecting and locating broken connections in a telecommunication network comprising a source node, a destination node and at least one intermediate node located along a communication path between the source node and the destination node, said method comprising the steps of:

generating a forward loopback packet in the source node;

forwarding the forward loopback packet, node by node, from the source node to the destination node along the communication path;

at each of the at least one intermediate nodes, transmitting a backward loopback packet towards the source node to an adjacent node located along the communication path, if the at least one intermediate node received the forward loopback packet;

at the destination node, transmitting another backward loopback packet towards the source node to an adjacent node located along the communication path, if the destination node received the forward loopback packet; and at the source node and each of the at least one intermediate nodes, generating a fault message if the backward loopback packet or the another backward loopback packet is not received within a predetermined period of time.

15. The method of claim 14 further comprising the step of:

at the source node and each of the at least one intermediate nodes, setting a timing counter when the forward loopback packet is forwarded towards the destination node to a next node along the communication path.

16. The method of claim 15, wherein the predetermined period of time is measured by the timing counters at the source node and at each of the at least one of the intermediate nodes.

17. The method of claim 14 further comprising the steps of:

at each of the at least one intermediate nodes, generating an acknowledge loopback packet if the backward loopback packet or the another backward loopback packet is not received within the predetermined period of time; and transmitting the acknowledge loopback packet to the source node, wherein the acknowledge loopback packet informs the source node that a broken connection has been detected.

18. The method of claim 17, wherein the acknowledge loopback packet is an end-to-end packet.

19. The method of claim 14 further comprising the step of:

at the destination node, generating an acknowledge loopback packet; and transmitting the acknowledge loopback packet to the source node, wherein the acknowledge loopback packet informs the source node that the destination node received the forward loopback packet.

20. The method of claim 14 further comprising the steps of:

at an input portion of the at least one intermediate node, generating an intermediate loopback packet upon receiving the forward loopback packet;

multiplexing the intermediate loopback packet onto a communication channel shared by the received forward loopback packet;

forwarding the intermediate loopback packet on the communication channel towards an output portion of the at least one intermediate node;

demultiplexing the intermediate loopback packet from the communication channel if the intermediate loopback packet reaches the output portion of the intermediate node; and generating an acknowledge loopback packet if the at least one intermediate loopback packet does not reach the output portion of the at least one intermediate node within a second predetermined period of time.

21. The method of claim 20 further comprising the steps of:

initiating a second timing counter in the at least one intermediate node when the intermediate loopback packet is generated; and determining whether the intermediate loopback packet reaches the output portion of the at least one intermediate node within the second period of time as a function of the second timing counter.

22. The method of claim 20 further comprising the step of:

transmitting the acknowledge loopback packet to the source node, wherein the acknowledge loopback packet informs the source node that a broken connection internal to the at least one intermediate node has been detected.

23. The method of claim 14, wherein the telecommunications network employs asynchronous transfer mode.

24. The method of claim 23, wherein the loopback packets are asynchronous transfer mode, adaptation layer number two, operation and maintenance packets.

25. The method of claim 14, wherein the forward loopback packet is a segment loopback packet.

26. The method of claim 14, wherein the backward loopback packets are segment loopback packets.

27. An apparatus for detecting a failure in a telecommunications network comprising:

means for forwarding a first communication packet from a first node to a second node adjacent to the first node in a first direction along a communication path;

means for forwarding the first communication packet from the second node to a third node adjacent to the second node in the first direction along the communication path;

means for transmitting a second communication packet from the second node to the first node in response to reception of the first communication packet from the first node; and first logic means for generating a fault signal indicating a failure between the first node and the second node if the second communication packet is not received by the first node within a predetermined period of time.

28. The apparatus of claim 27 further comprising:

means for transmitting a third communication packet from the first node to a source node, if the second communication packet is not received by the first node, wherein the third communication packet informs the source node that a fault has been detected.

29. The apparatus of claim 28, wherein the third communication packet is transmitted along the communication path in a second direction that is opposite the first direction.

30. The apparatus of claim 27, wherein the predetermined period of time is measured from when the first communication packet is forwarded from the first node to the second node.

31. The apparatus of claim 30 further comprising:

second logic means for setting a timing counter when the first communication packet is forwarded from the first node to the second node.

32. An apparatus for detecting a failure in a telecommunications network comprising:

means for forwarding a first communication packet in the direction of a destination node from a first node to a second node adjacent to the first node, wherein the second node is located along a communication path between the first node and the destination node;

first logic means for setting a timing counter in the first node when the first node forwards the first communication packet to the second node;

means for forwarding the first communication packet along the communication path in the direction of the destination node from the second node to a next node adjacent to the second node;

means for transmitting a second communication packet from the second node to the first node in response to reception of the first communication packet from the first node; and second logic means for generating a fault message if the second communication packet is not received by the first node within a predetermined period of time as measured by the timing counter.

33. The apparatus of claim 32 further comprising:

means for transmitting a third communication packet from the first node to a source node if the second communication packet is not received by the first node within the predetermined period of time, wherein the third communication packet informs the source node that a failure has been detected between the first and second nodes.

34. The apparatus of claim 32, wherein the first node is a source node.

35. The apparatus of claim 32 further comprising:

means for forwarding the fault message from the first node to a network manager.

36. The apparatus of claim 32 further comprising:

means for forwarding the first communication packet along the communication path, node by node, from the next node to the destination node;

at the next node, the destination node, and each node located between the next node and the destination node, if any, means for transmitting another second communication packet to an adjacent node located along the communication path towards a source node in response to receiving the first communication packet; and at the second node, the next node and each node between the next node and the destination node, if any, third logic means for generating a fault message if the another second communication packet is not received within a predetermined period of time.

37. The apparatus of claim 36 further comprising:

at the second node, the next node and each node between the next node and the destination node, if any, means for transmitting a third communication packet to the source node if the another second communication packet is not received within the predetermined period of time, wherein the third communication packet informs the source node that a fault has been detected.

38. The apparatus of claim 37, wherein the first node is the source node.

39. The apparatus of claim 36 further comprising:

at the second node, the next node and each node between the next node and the destination node, if any, means for transmitting the fault message to a network manager if the fault message is generated.

40. An apparatus for detecting and locating broken connections in a telecommunication network comprising a source node, a destination node and at least one intermediate node located along a communication path between the source node and the destination node, said method comprising:

first logic means for generating a forward loopback packet in the source node;

means for forwarding the forward loopback packet, node by node, from the source node to the destination node along the communication path;

at each of the at least one intermediate nodes, means for transmitting a backward loopback packet towards the source node to an adjacent node located along the communication path, if the at least one intermediate node received the forward loopback packet;

at the destination node, means for transmitting another backward loopback packet towards the source node to an adjacent node located along the communication path, if the destination node received the forward loopback packet; and at the source node and each of the at least one intermediate nodes, second logic means for generating a fault message if the backward loopback packet or the another backward loopback packet is not received within a predetermined period of time.

41. The apparatus of claim 40 further comprising:

at the source node and each of the at least one intermediate nodes, third logic means for setting a timing counter when the forward loopback packet is forwarded towards the destination node to a next node along the communication path.

42. The apparatus of claim 41, wherein the predetermined period of time is measured by the timing counters at the source node and at each of the at least one intermediate nodes.

43. The apparatus of claim 40 further comprising:

at each of the at least one intermediate nodes, third logic means for generating an acknowledge loopback packet if the backward loopback packet or the another backward loopback packet is not received within the predetermined period of time; and means for transmitting the acknowledge loopback packet to the source node, wherein the acknowledge loopback packet informs the source node that a broken connection has been detected.

44. The apparatus of claim 43, wherein the acknowledge loopback packet is an end-to-end packet.

45. The apparatus of claim 40 further comprising:

at the destination node, third logic means for generating an acknowledge loopback packet; and means for transmitting the acknowledge loopback packet to the source node, wherein the acknowledge loopback packet informs the source node that the destination node received the forward loopback packet.

46. The apparatus of claim 40 further comprising:

at an input portion of the at least one intermediate node, third logic means for generating an intermediate loopback packet upon receiving the forward loopback packet;

an intermediate loopback multiplexer for multiplexing the intermediate loopback packet onto a communication channel shared by the received forward loopback packet;

means for forwarding the intermediate loopback packet on the communication channel towards an output portion of the at least one intermediate node;

an intermediate loopback demultiplexer for separating the intermediate loopback packet from the communication channel if the intermediate loopback packet reaches the output portion of the at least one intermediate node; and fourth logic means for generating an acknowledge loopback packet if the intermediate loopback packet does not reach the output portion of the at least one intermediate node within a second predetermined period of time.

47. The apparatus of claim 46 further comprising:

fifth logic means for initiating a second timing counter in the at least one intermediate node when the intermediate loopback packet is generated; and sixth logic means for determining whether the intermediate loopback packet reaches the output portion of the at least one intermediate node within the second period of time as a function of the second timing counter.

48. The apparatus of claim 46 further comprising:

means for transmitting the acknowledge loopback packet to the source node, wherein the acknowledge loopback packet informs the source node that a broken connection internal to the at least one intermediate node has been detected.

49. The apparatus of claim 40, wherein the telecommunications network employs asynchronous transfer mode.

50. The apparatus of claim 49, wherein the loopback packets are asynchronous transfer mode, adaptation layer number two, operation and maintenance packets.

51. The apparatus of claim 40, wherein the forward loopback packet is a segment loopback packet.

52. The apparatus of claim 40, wherein the backward loopback packets are segment loopback packets.

* * * * *